United States Patent [19]
Smith et al.

[11] Patent Number: 5,847,912
[45] Date of Patent: Dec. 8, 1998

[54] ACTIVE RECTIFICATION AND BATTERY PROTECTION CIRCUIT

[76] Inventors: Gregory J. Smith; Anthony D. Wang, both of 6377 E. Tanque Verde, Suite 101, Tucson, Ariz. 85715

[21] Appl. No.: 642,501

[22] Filed: May 3, 1996

[51] Int. Cl.⁶ .................................................. H02H 3/00
[52] U.S. Cl. ................... 361/93; 361/82; 361/84; 361/115
[58] Field of Search ................. 361/82, 84, 93, 361/115; 320/39, 5

[56] References Cited

U.S. PATENT DOCUMENTS

| | | | |
|---|---|---|---|
| 4,870,555 | 9/1989 | White | 363/21 |
| 4,922,404 | 5/1990 | Ludwig et al. | 363/89 |
| 5,097,403 | 3/1992 | Smith | 363/127 |
| 5,539,299 | 7/1996 | Fernandez et al. | 320/39 |

*Primary Examiner*—Jeffrey A. Gaffin
*Assistant Examiner*—Stephen Jackson
*Attorney, Agent, or Firm*—Thomas L. Bohan

[57] ABSTRACT

An active rectifier circuit for automatically selecting a pathway for reversible current to move. The rectifier circuit includes a transistor element that is preferably a MOSFET controlled by an amplifier. The amplifier is coupled to a reference voltage source that regulates operation of the transistor element at a potential much lower than is currently available with diode devices. In one application, the rectifier is a battery protection circuit for use within rechargeable battery packs. The battery protection circuit employs the amplifier to drive a pair of discrete MOSFETs having their sources coupled together. In this application, the amplifier functions as a sensitive current detector. The battery protection circuit automatically detects when any battery cell is over-charged or under-charged thereby opening and protecting the MOSFETs. The battery protection circuit determines the direction of current flow within the battery pack. It also automatically detects safe conditions for recovery from an over/under discharge or overcurrent conditions. Optional digital switches may be employed to regulate on, off, and direction of current flow permitted through the MOSFET pair, which effectively is a low-turn-on-threshold reversible diode.

18 Claims, 7 Drawing Sheets

ACTIVE RECTIFICATION AND BATTERY PROTECTION CIRCUIT

BACKGROUND OF THE INVENTION

1. Field of the Invention

This invention relates to rectification circuits. In particular, this invention is directed to such circuitry that can automatically—that is, actively—identify the change in direction of a signal and respond in kind. More particularly, the present invention is related to rechargeable-battery protection circuitry. Specifically, this invention relates to circuitry designed to determine the current flow direction within a battery pack. It is further directed to prevention of overcharging and over-discharging of rechargeable batteries. More particularly, this invention is directed at such protection circuitry to be included as an integral part of a battery pack containing the cells to be protected.

2. Description of the Prior Art

It is well known that rectification is useful in preventing undesired current flow direction. Simply stated, rectification involves the application of a nonlinear device that ideally permits current to flow in one direction while preventing flow in the opposite direction. While the usefulness of an effective rectifier is evident in many applications, it is of primary interest in the field of rechargeable batteries—particularly those rechargeable batteries designed to operate at very low power levels for extended periods of time.

Rechargeable battery technology has become a very active research field with the continued increase in the use of portable electronic equipment such as laptop computers, audio and video equipment, and cellular phones. As the demand for portability and system complexity increases, the demands on rechargeable battery technology also grow, especially with respect to making the battery packs lighter and higher capacity. In response to those conflicting requirements, battery research and development has turned to lithium-ion (Li+) rechargeable cells. Li+ cells offer a significant improvement in specific energy (W-hr/kg) characteristics over traditional nickel-based battery technology. In order to take advantage of this improvement, it is necessary to compensate for the fact that Li+ cells are considerably less robust than those of the older technology. In particular, they are much more susceptible to damage from electrical stresses such as being overly discharged while powering a load, overly charged during the charging cycle, or being confronted with a charging voltage of the wrong polarity. It is therefore desirable to build directly into the battery pack protective circuitry to prevent these stresses to the cells: circuitry interposed between the cells and the charging/discharging terminals. By incorporating the protective circuitry into the battery pack containing the Li+ cells, portability constraints are satisfied at the same time that ever-present protection is provided. Battery packs with such in-pack protection are known as "smart batteries."

The typical rechargeable battery normally exists in one of three states with respect to the topic under discussion. In the charging state, the battery will have its two terminals connecting to a charger. The charger commonly provides a DC current capable of charging the battery up to its proper "charged" voltage. As the charging continues the voltage applied to the battery's terminals gradually rises. Ideally, it rises asymptotically to a voltage within the acceptable range for the battery. I.e., the charging process should not continue to drive current onto the battery after it is fully charged. If the charger has become defective, or if the user has chosen to apply a charger not designed for the parameters of the battery to be charged, excess charging may occur in the absence of protective circuitry. In principle, it is also possible that the incorrect charger polarity will be applied to the battery terminals by the user. To protect against the latter eventuality previous battery packs have been provided with a passive rectifying circuit connected across the terminals. This approach presents certain problems when the battery is used to provide current to its design load.

In its discharging state, the battery has its terminals coupled to the load —e.g. a laptop computer circuit—that it has been designed to power. As it provides power to the load, it discharges and its output voltage drops. For certain types of cells, including Li+ cells, the output voltage remains nearly constant for most of the discharge cycle, then begins to fall rapidly. There will be a minimum voltage below which the electronic appliance will not operate properly. Furthermore, there will be a voltage below which further discharge of the battery will permanently harm the battery. Concurrently the protective circuitry must prevent the battery from continuing to discharge once it has reached a certain discharge level.

The third state that the battery pack is normally placed in is the "unused" state, where it is neither being charged or serving as a power supply. It may be disconnected from any other circuit, e.g., literally on the shelf. When the battery is in this state, a desirable role of the protective circuitry is to minimize the drain on the battery in this state and thus extend its shelf life.

Although there have been earlier attempts to provide the desired protective circuitry, they have all been lacking in one major regard, as well as in a number of minor ways. In particular, none of the prior art incorporated an amplifier to establish a low-voltage-drop rectifier designed to determine whether a battery pack can continue to be charged or discharged, respectively. As a consequence, the prior art devices had to be directed to turn on and off; they were not automatic. Furthermore, they did not have the capability to act as sensitive current detectors, a feature necessary to react to current crossover.

An exemplar prior rectifying device is illustrated in FIG. 1 in simplified form. The previous device includes an integrated circuit (IC) 10 that is typically used for Li+ protection circuits known by those skilled in the art. The IC is coupled to a back-to-back pair of field effect transistors (FETs) M1 and M2, each of which has its own body diode, diode D1 for M1 and D2 for M2. These components are contained within a battery pack 11, which may include more than one battery cell. It is well known that these body diodes are commonly part of discrete MOS transistors and cannot be removed. Simply stated, the prior device operates such that when transistor M1 is on, the battery pack cannot block discharging current, and when transistor M2 is on, the battery pack cannot block charging current. This passive arrangement requires an external device, the IC 10, to inform the FETs when there is a change in polarity of the signal to the Li+ battery. The notification from the IC 10 to initiate operation of the FETs is a synchronizing signal. Given the high potential drop required to initiate operation of the body diodes—800 mV or more—there is a considerable error in monitored voltage before appropriate charging or discharging of the battery occurs. This is a key deficiency in the prior devices. Moreover, given voltage drops of that level, and the currents that are typically experienced—on the order of one ampere—there is considerable power dissipation that yields undesirable heating of the unit, including the battery pack and the circuitry to which it is applied. One solution to this problem has been to keep both transistors on so as to reduce the effects of the diode drops; however, the benefit of rectification is eliminated in this mode of operation due to the way that the transistors are coupled.

Therefore, what is needed is a rectifying device that responds quickly to signal-polarity swings and that uses very little power to achieve rectification. In the particular area of battery protection, what is needed is such circuitry that can be incorporated into a pack containing the battery so as to provide active rectification of any voltage source used to charge the battery—that is, rectification circuitry that responds virtually instantaneously to changes in signal polarity—without instructions from external circuitry. What is also needed is such circuitry that provides a sensitive means of monitoring the cell voltage so that over-charging and over-discharging of the battery is prevented. What is further needed is such circuitry that responds to current polarity changes, including those that occur when the current is relatively low and that may result in overcharging of the pack over a period of time. Still further, what is needed is such circuitry that can be manufactured relatively inexpensively and which presents a minimal drain on the battery being protected.

SUMMARY OF THE INVENTION

Accordingly, it is an object of the present invention to provide rectification circuitry that actively responds to changes in current polarity and that does so with minimal power consumption. It is a particular object of the present invention to provide such circuitry in the context of a battery protection device so as to minimize power consumed from the battery. More particularly, the circuit according to the present invention resides within the battery pack. It is a further object of the present invention to provide accurate in-pack current—polarity sensing. Another object of the present invention is to provide a battery protection circuit with automatic rectifier control. Still another object of the present invention is to provide a battery protection circuit operable over a wide range of currents and load levels, and tolerant of momentary surge faults.

These and other objectives are accomplished in the present invention by providing a rectification circuit having a pair of transistors coupled to an operational amplifier. The amplifier is designed to regulate the control nodes of the transistors as a function of the polarity of an external current source. The amplifier controls whether the transistors are on or off. The transistors effectively act as a single transistor without a body diode.

A key feature of the rectifier of the present invention involves the potential at which switching of the operation of the transistors occurs. In the prior-art device illustrated in FIG. 1, that happens at a level of 800 mV or more—when the threshold of the particular transistor's body diode is reached. The present device involves the connection of a voltage source that activates one or the other of the transistors at a minimal turn-on level—on the order of about 36 mV in the preferred embodiment of the invention. It can easily be seen that at this more than 20-fold reduction in switching level, power dissipation is significantly reduced. The low-voltage source couplable to the amplifier may be developed in a number of ways well known to those skilled in this field. A preferable way, although not limiting, would be to couple the amplifier to a current source that includes two bipolar transistors sized unequally such that a small potential difference is developed sufficient to activate the MOSFET-pair gate.

In a particular embodiment, the present invention is directed to protection of a battery. The battery protection circuit includes the amplifier that controls an ON/OFF state of the transistor pair that is placed in series with the battery cell. The transistors may be of any type but are preferably low-threshold N-channel power Metal-Oxide-Semiconductor Field Effect Transistors (MOSFETs). The MOSFETs function to protect the battery cell from inadvertent over-stress. The battery protection circuit compares the cell voltage with predetermined minimum and maximum voltage limits. The battery protection circuit also monitors the bidirectional current flow to and from the battery by measuring the voltage across a current-sensing resistor internal to the battery protection circuit. The battery protection circuit turns the MOSFETs OFF whenever any predetermined fault limit is exceeded. This configuration according to the present invention allows momentary surge faults to be tolerated. The primary components of the protection circuit are the two transistors having a common gate coupled to the amplifier, which is preferably an operational transconductance amplifier.

When used as a battery protection device, the circuitry of the present invention can be prepared in a number of embodiments. A key element is the amplifier that operates to drive a pair of MOSFETs internal to the battery pack and external to the rechargeable cell(s). The amplifier is coupled to the gates of the MOSFETs such that current is permitted to move in one automatically-selected direction when the device is activated. When only a single cell is to be protected with the present active-rectification circuit, the MOSFET pair is preferably a set of N-type MOSFETs; however, it is to be understood that the circuit is not limited to that configuration alone. When two cells in a pack are to be protected, there may be two N-type FETs or two P-type FETs. For three cells or more, it is preferable to design the rectification circuitry using corresponding pairs of P-type MOSFETs because the excess gate drive that is available overcomes the on-resistance limitations characteristic of P-type MOSFETs.

The battery current is monitored continuously by measuring the voltage across an internal sense resistor. If the terminal current exceeds the predetermined maximum charging current ($I_{MAX\text{-}CHG}$) in the charge mode for a period longer than a predetermined overcurrent time ($t_{OVERCURRENT}$) the disconnect-and-power-down mode is entered. If the terminal current exceeds the predetermined maximum discharging current ($I_{MAX\text{-}DIS}$) in the discharge mode for a period longer than the predetermined overcurrent time ($t_{OVERCURRENT}$), the disconnect-and-power-down mode is entered. Recovery to conduction mode requires either the removal and re-connection of the battery pack from the load or charger or a momentary disconnect using some type of switching means. Once the operating conditions are safe for discharge, the battery protection circuit allows the battery pack to be active again.

Switching of the operational mode of the rectification circuit may be achieved digitally by means well known to those skilled in the art. The operation of the device preferably includes a complete on or off of the FETs, as well as a switching of polarity when the device is actively rectifying.

It will be apparent to one skilled in the art through the following description of the drawings and description of the preferred embodiment that numerous variations exist which are well within the scope of the present invention. The accompanying drawings and descriptions are merely illustrative of one form of the present invention and are not meant to be construed as limiting the rectification and battery protection circuitry of the present invention to any particular use or setting.

DESCRIPTION OF THE PREFERRED EMBODIMENT

Figure 1:
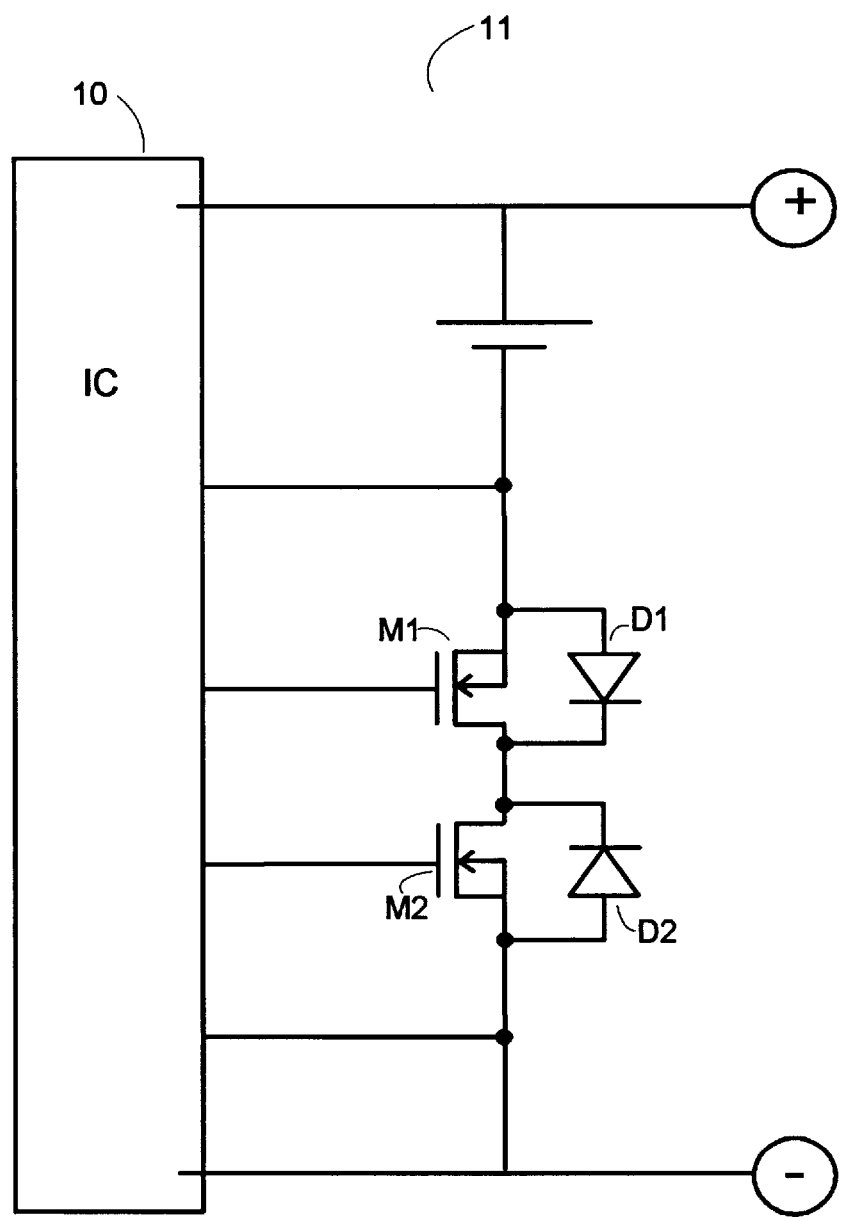
FIG. 1 is a simplified diagram of a battery-protection circuit of the prior art, showing generally the coupling of a controlling integrated circuit to a pair of MOSFETs.
Figure 2:
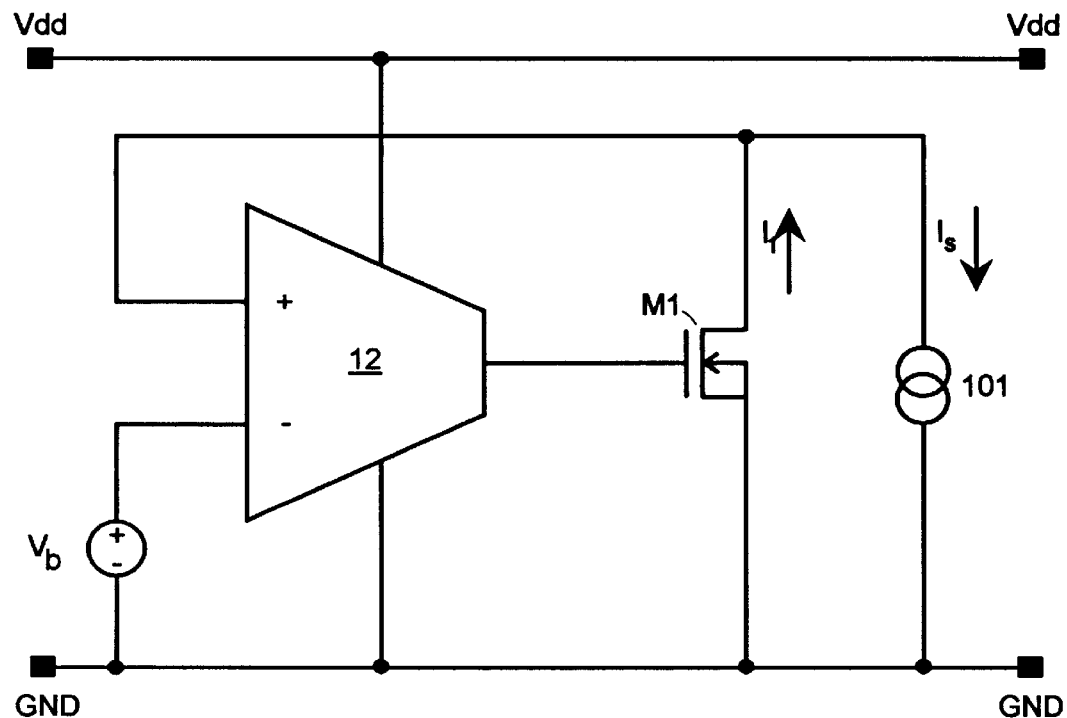
FIG. 2 is a simplified summary diagram illustrating the resultant active rectification operation of the circuit of the present invention.

In FIG. 2, an amplifier element 12 is shown generally as the controlling element in an active-rectification circuit. The amplifier element 12 is an Operational Transconductance Amplifier (OTA) which drives a MOSFET M shown in an ideal state having no body diode. In the preferred embodiment of the present invention, that ideal, body-diode-free MOSFET M is actually a pair of back-to-back MOSFETs used to automatically block currents in both directions when both MOSFETs are off. The active rectification that results may be accomplished over a wide range of frequencies—from DC to radio—and in a variety of applications. For the purpose of the detailed description of the present invention, the discussion of the invention will focus on the protection of a Li+ battery cell; however, it is to be understood that the rectifier may be directed to other applications as well.

With continuing reference to FIG. 2, an external current source, 101, is shown as a supply of current $I_s$. In the context of a battery-pack-protection device, this is the source of power to charge the battery pack. In the present invention, the current $I_s$ supplied by this current source 101 is diverted to ground by MOSFET M if and when current $I_1$, within the branch noted has the polarity of current $I_s$. The drain of MOSFET M is connected to the noninverting input of OTA 12, the open-loop gain of which attempts to drive the voltage at the drain of MOSFET M to a pre-set reference voltage $V_B$. Should the polarity of current $I_1$ reverse, the drain node of MOSFET M (and, therefore, the noninverting input of OTA 12) is pulled below $V_B$. The OTA 12 then automatically forces MOSFET M off and maintains MOSFET M in the non-conducting state until the current $I_1$ reverses polarity again. It is thus possible, when charging the battery pack, to apply either a DC current source (of the proper polarity) or to apply an AC current source.

The selective transmission of current described above is an example of programmable active rectification. It is programmable in the sense that the ON voltage of MOSFET M—i.e., the voltage at which the MOSFET M is turned on—can be set by the value selected for $V_B$. Ideally, one would like to set $V_B$ to zero, so as to provide an ideal rectifier (zero "on" voltage). Unfortunately, in the real world this is not possible; the non-zero output resistance of the MOSFET M precludes this. Nevertheless, it is desirable to select as low a value for $V_B$ as is possible, provided that that value exceeds the offset of the amplifier 12. A lower value of $V_B$ enhances the flexibility of the device in that currents can be rectified with no cross-over error independent of the specifics of the amplifier, e.g., its finite offset voltage. In addition, the use of a low $V_B$ minimizes the power dissipation in the rectifying element, the external MOSFET M. It is to be understood that the value of $V_B$ is selectively variable which allows the circuit to accomplish its function over a wide range of current values. As the current increases, a value is reached whereupon the output of the OTA 12 saturates and is unable to drive the gate of the MOSFET M any higher, i.e., to turn the MOSFET M any further "on." The voltage drop across the MOSFET M then increases due to the fixed-channel resistance of the MOSFET M.

Figure 3:
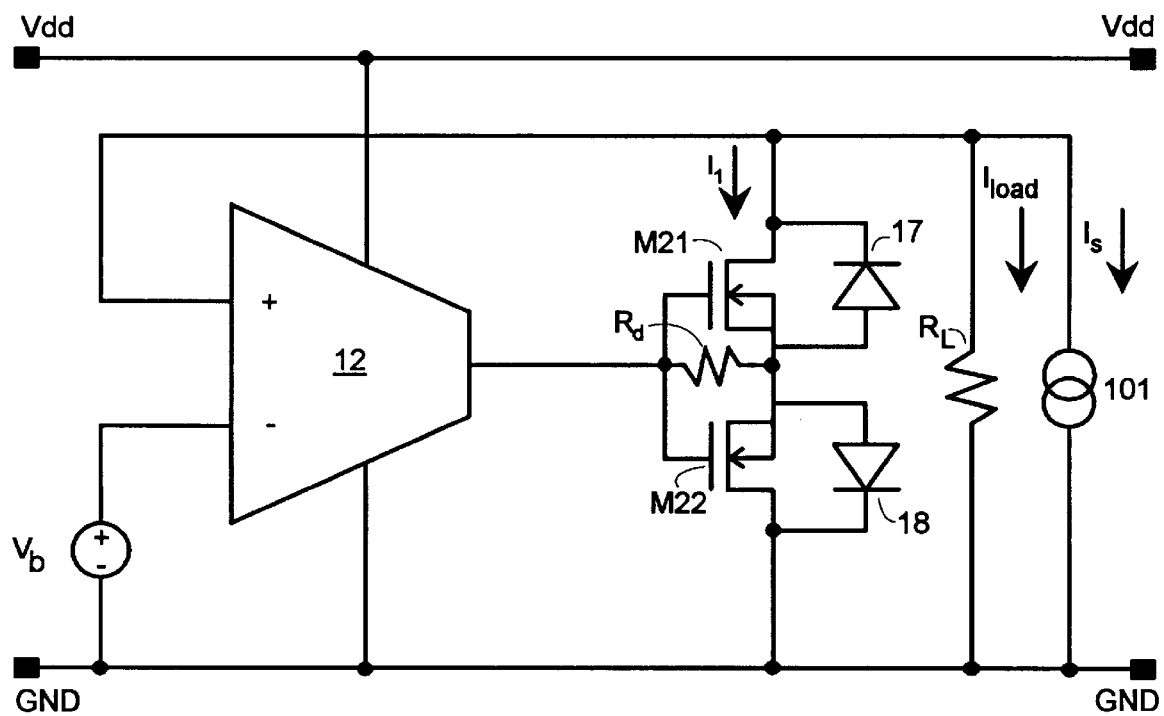
FIG. 3 is a more detailed illustration of the active rectification circuit of the present invention, showing the MOSFET pair coupled to the amplifier and to their respective body diodes.

FIG. 3 presents a particular embodiment of the general concept of active rectification shown in FIG. 2. It is to be understood that while one particular circuit arrangement is shown, other topological variations would perform the same function. That is, a key to the operation of the present device is the use of a body-free-diode transistor. In the particular embodiment shown in FIG. 3, that body-diode-free transistor is in the form of a pair of back-to-back MOSFETs. However, alternative arrangements may be used. As seen in FIG. 3, the OTA 12 drives the common gates of a pair of back-to-back N-channel MOSFETs, M21 and M22. As previously noted, it is preferable to use two N-channel MOSFETs when a single battery cell is to be protected. For three or more cells, the MOSFETs are preferably P-channel. In either case, it is to be understood that the rectifier is operable with either MOSFET type in conjunction with the OTA 12 and the reference voltage $V_B$. Note that the sources of the two N-channel MOSFETS M21 and M22 are tied together, whereas in the prior-art device, in addition to having no amplifier means, the MOSFETs have their drains tied together. Resistor $R_D$ is a shunt between the gate and source terminals of both N-channel MOSFETS M21 and M22 and provides a discharge path for the gates of these transistors during the interval that the FETs are nonconducting. Alternatively, the discharge path may be provided through active-FET gate-to-source turn-off switches, or other well-known means.

With continuing reference to FIG. 3, note the parasitic body diodes 17 and 18. If only one MOSFET device is used, i.e., M21 or M22, and the gate drive is zero, the related parasitic body diode of the device, 18 or 17 respectively, would bypass the OFF device. The series connection of the discrete MOSFETs, M21 and M22, accommodates transmission (when the common gates of M21 and M22 are HIGH) and blocking (when the gates are LOW) for current $I_1$ of either polarity. In this way, current $I_{load}$ may be supplied to the device to be powered, identified as load $R_L$, without damage to the battery cell and without affect on charging of the cell.

Figure 4:
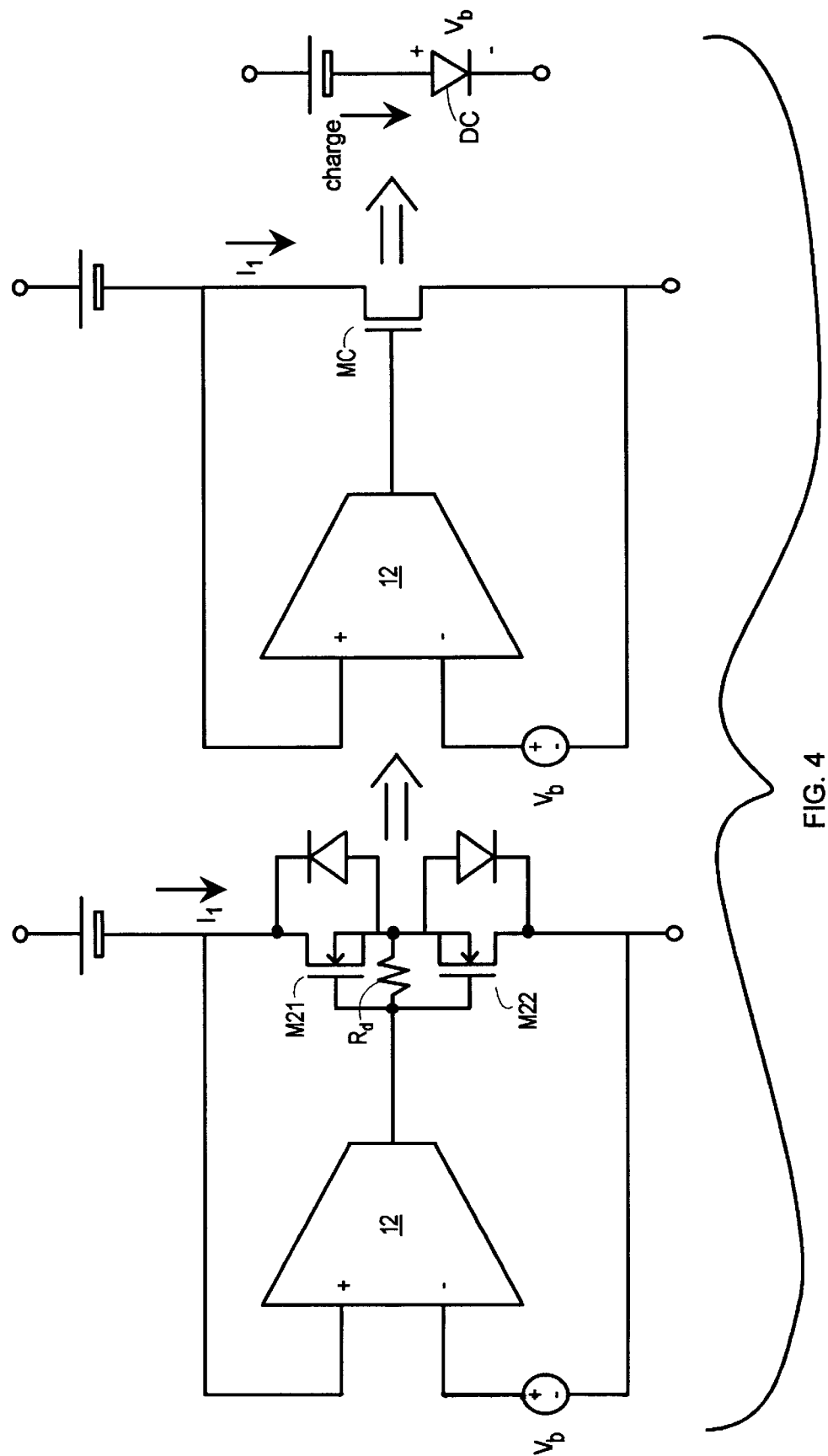
FIG. 4 is an illustration of the resultant effect of the rectification circuit of FIG. 3 when the circuit is active and with the battery being charged.
Figure 5:
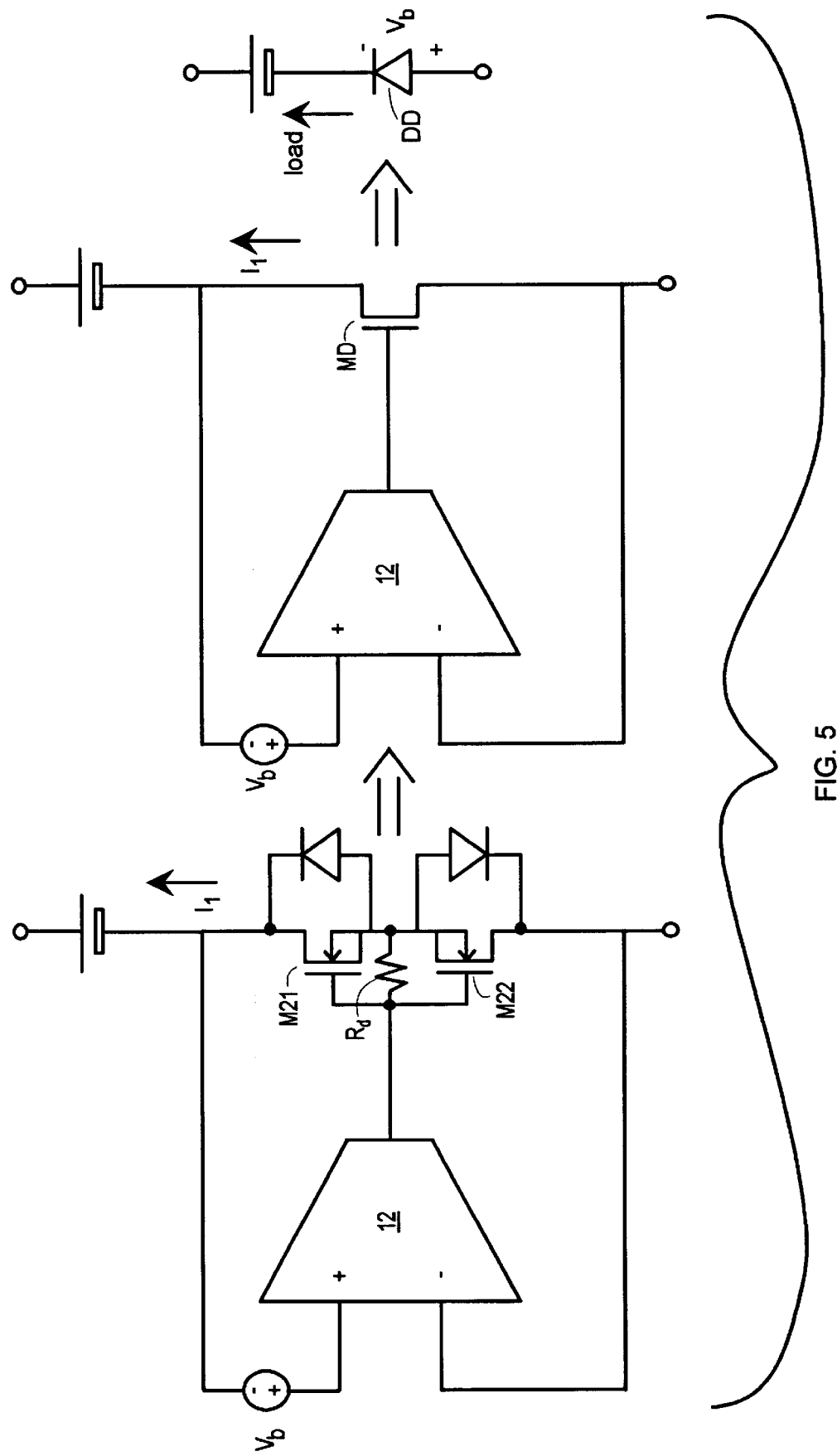
FIG. 5 is an illustration of the resultant effect of the rectification circuit of FIG. 3 when the circuit is active and with the battery discharging to a load.

A summary of the effect of the polarity of the source current 11 on the operative characteristic of the active rectification circuit is illustrated in FIGS. 4 and 5. In FIG. 4, the source current $I_1$ is shown as being of negative polarity (that is, the battery is charging) and the MOSFET pair M21 and M22 effectively behave as a single FET. Note that the pack cannot be loaded in this configuration. This arrangement eliminates the body diode effect of the transistor in operation and the forward drop of the resultant forward-biased effective "diode" is $V_B$. The combination of M21 and M22 in this instance results in an "ideal" charging transistor MC that acts as a low-turn-on-threshold diode DC. In FIG. 5, the source current $I_1$ is shown as being of positive polarity (that is, the battery is being loaded) and the MOSFET pair M21 and M22 effectively acts as a single FET. This arrangement eliminates the body diode effect of the transistor in operation and, again, the forward drop of the resultant forward-biased effective "diode" is $V_B$. The combination of M21 and M22 in this instance results in an "ideal" discharging transistor MD that acts as a low-turn-on-threshold diode DD. Note that the pack cannot be charged in this configuration.

Figure 6:
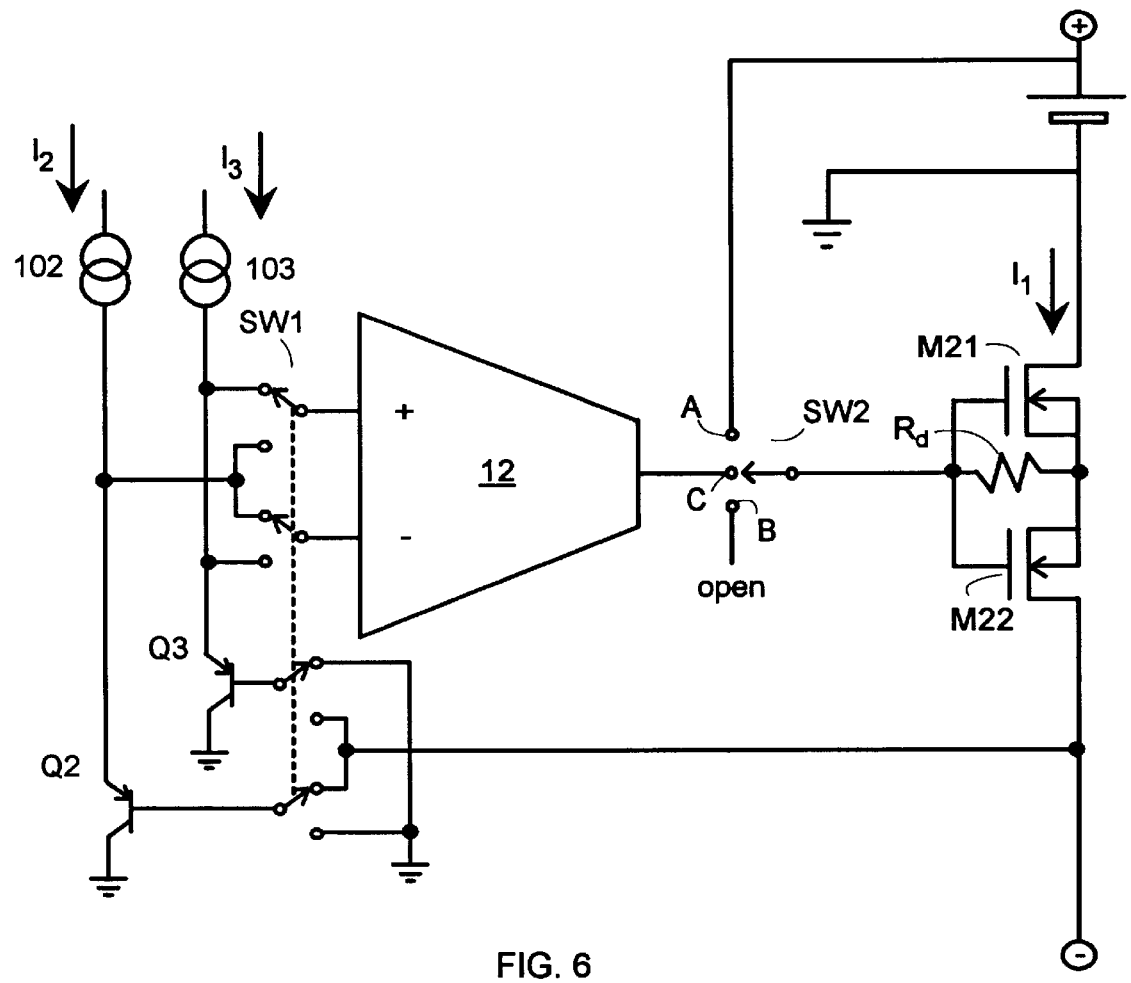
FIG. 6 is a simplified illustration of the preferred implementation of the active rectification circuit of the present invention, showing the multiple-mode selection switching operation of the device and the means by which the biasing voltage is implemented.

As illustrated in FIG. 6, transistors Q2 and Q3 may be utilized as a specific means for developing the reference voltage $V_B$. Transistors Q2 and Q3 are preferably shown as PNP-type bipolar transistors. While alternative means may be provided for developing an applied voltage on the inverting and noninverting terminals of the OTA 12, it has been determined that this is a particularly efficient way to develop the reference voltage $V_B$. In active operation of the present invention, transistors Q2 and Q3 are on, pursuant to biasing from currents $I_2$ and $I_3$ developed by sources 102 and 103, respectively. A voltage differential is developed on the OTA 12 that is based upon the current densities of the respective bipolar transistors as determined by the equation $V=kT/q*\ln((A_2*I_3)(A_3*I_2))$, where $A_2$ is the emitter area of transistor Q2 and $A_3$ is the emitter area of transistor Q3. Of course, it is to be understood that this equation is directed to the specific arrangement illustrated in FIG. 6 and that details of the actual $V_B$ actually developed will depend upon the parameters selected. For example, in the circuitry shown in FIG. 6 and with $I_2=I_3$, if $A_2=4A_3$, $V_B$ is about 36 mV for typical PNP bipolar transistors.

With continuing reference to FIG. 6, it can be seen that digital means may be coupled to the OTA 12 and the MOSFETs M21 and M22 so as to control operation of the active rectification circuit. In particular, amplifier switch SW1 provides the means for selecting the operational direction of the effective low-turn-on-threshold diode, either DD or DC. Optional regulating switch SW2 may be included as part of the rectification device in order to control the operation of the MOSFET pair M21 and M22. Switch SW1 is designed to change the polarity of the feedback to the OTA 12 so as to identify the direction of active rectification. When SW1 is connected as shown and with SW2 connected in the active rectification mode at node C, the device acts as a charge-only rectifier. With SW1 connected in the opposite way so that the base of transistor Q2 is coupled to ground, the device acts as a discharge-only rectifier.

With continuing reference to FIG. 6, it can be seen that with SW2 connected at position A, the gates of the transistors are biased HIGH such that they always exceed the threshold for bidirectional operation. That is, they are both always on. When the switch SW2 is in position B, the gates of the transistors are biased LOW, the transistors are not driven and resistor $R_d$ effectively collapses the gate-source voltage $V_{gs}$ of each transistor M21 and M22 to zero so that both MOSFETs are off. Finally, with switch SW2 in position C, the device is in active rectification mode and switch SW1 is determinative of rectification direction, as indicated in the earlier discussion regarding that switch.

Figure 7:
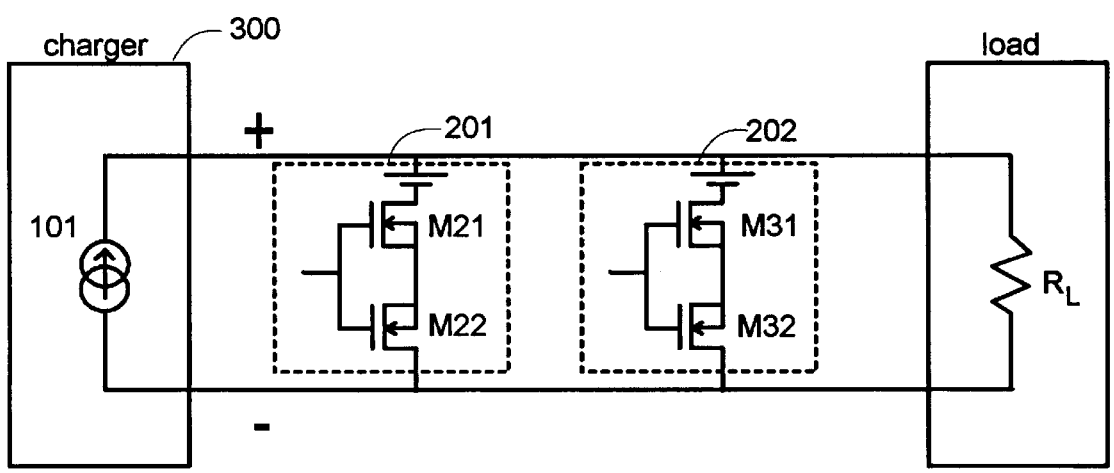
FIG. 7 is a simplified illustration of the application of a pair of battery packs, including their respective FETs, in combination with a charger and a load to be supplied by the packs.

FIG. 7 provides a basic simplified illustration of a pair of battery packs 201 and 202. The first pack 201 is shown with transistor pair M21 and M22, and second pack 202 is shown with transistor pair M31 and M32 in an arrangement similar to that presented in the previous figures and without showing the coupling to an OTA. The pack is shown coupled to a charger 300 having current source 101 and to a load that is resistance $R_L$. Of course, a battery of the type shown may include more than two protected battery packs. The charger 300 may be of any type deemed sufficient for the particular application. In summary, it is the function of the active rectification device of the present invention to prevent: 1) overcharging from the charger 300 to the battery cells pursuant to the selection of the particular transistor coupled to the OTA 12; 2) overdischarging when there is no charge; and 3) the current from one pack to flow into another pack whenever a charge or a load is applied.

Although the design set out in FIG. 3 is relatively straightforward, a closer consideration of MOSFET I-V characteristics shows that it is not. In particular, with the simple circuit of FIG. 3, where the MOSFETs act as an inverter with gain, an unstable situation may develop when the discrete MOSFETS M21 and M22 are biased at such low currents that they operate in saturation and hence manifest extremely high output impedances.

For the purpose of analysis of this problem, it is to be noted that the discrete MOSFETs M21 and M22 in conjunction with the external load resistance $R_L$ form a second gain stage in series with the OTA 12. (The external load resistance in combination with the output impedance of this stage yields an effective resistance $R_L'$.) Under high current conditions, the gain of the second stage, the output stage (the FETs), is reduced and its corner frequency is much higher than that of the input stage (the OTA). Consequently, the composite gain is little affected, qualitatively or quantitatively, by the existence of the second gain stage. In contrast, when the biasing current is low the second stage has a very high gain and a correspondingly low corner frequency. Exacerbating the problem is the fact that the increase in second stage gain lowers the corner frequency of the first stage (as a result of the Miller-multiplied gate-drain capacitance of MOSFET M21 dominating the pole frequency). The resulting composite gain and phase response then becomes rife with gain and phase margin problems.

Traditional amplifier designs avoid the problem set out above by biasing the output stage so that it forms a Class AB amplifier; some minimum level of bias is always maintained. Also, for traditional applications, the load resistance is normally never as high as the $R_L'$ described above. These options are not open to the present circuit, for which the output stage (the external MOSFETs) must operate from zero current to unspecified maximum current into loads that vary from infinity down to zero ohms. Thus, a different approach is required.

One way in which to meet the performance requirements of the present circuit would be to design an input stage having a sufficiently broad bandwidth that its corner point occurs far out beyond where the overall gain falls to unity. Unfortunately, present practical fabrication considerations rule this option out.

Figure 8:
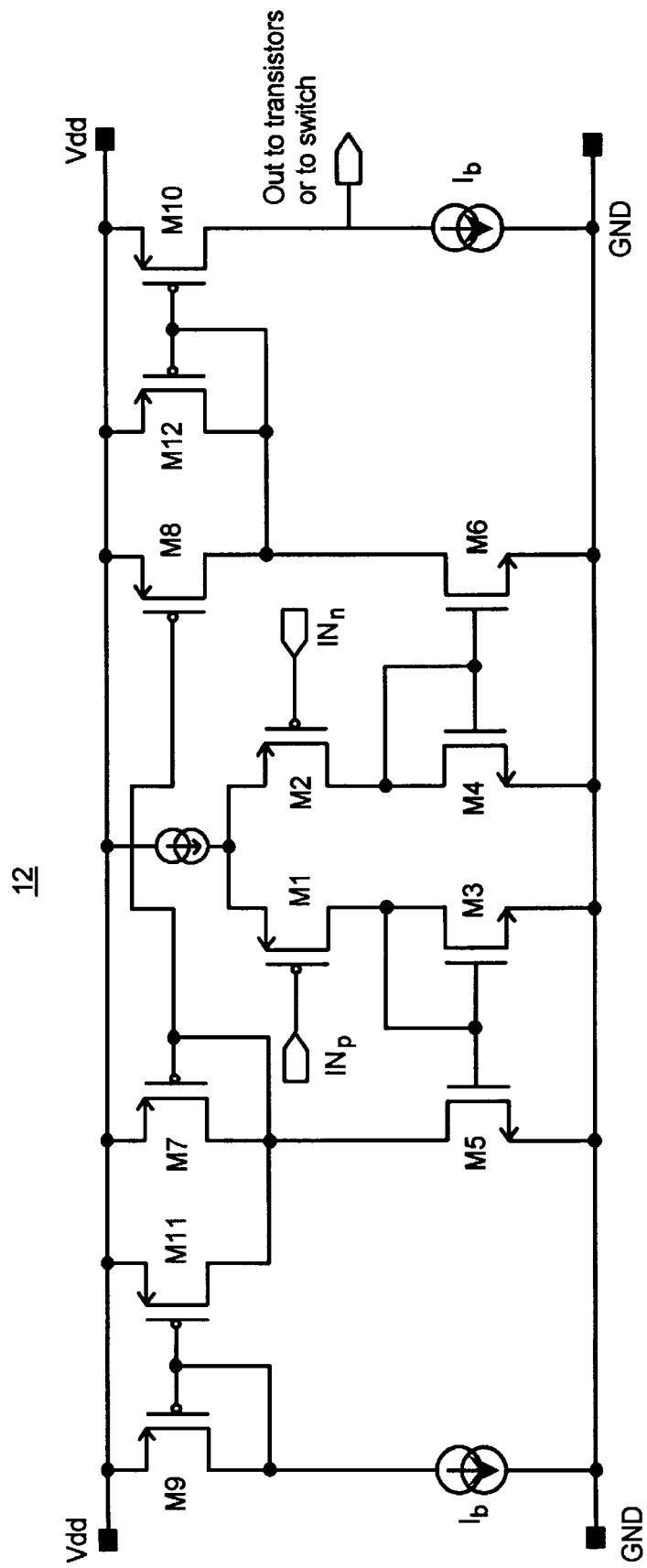
FIG. 8 is a detailed illustration of the preferred implementation of the amplifier of the protection circuit in accordance with the present invention.

Another approach, and the one used in the present invention, is to make the gain of the input stage (the OTA 12) low enough so that the overall gain reaches unity before phase margin becomes a problem. This can be done relatively easily, i.e., with high yield, with present fabrication techniques. There are a number of circuit designs implementing this approach; FIG. 8 shows the one used in the preferred embodiment of the present invention.

FIG. 8 details a specific circuit design showing the OTA 12 elements according to the preferred embodiment of the present invention. Here again, it is to be understood that while one particular circuit design is shown, other variations apparent through the below detailed description may be used without straying from the scope of the invention. In FIG. 8, the OTA stage 12 is shown to preferably include eight transistors, M1 through M8 arranged substantially symmetrically in two groups. The groups include transistors M1, M3, M5, M7 in one group and transistors M2, M4, M6, M8 in the other group. Specifically, M1, M2, M7, and M8 are shown as P-channel MOSFETs and M3, M4, M5, and M6 are shown as N-channel MOSFETs. The sources of M1 and M2, which may go through a current source, as well as M7 and M8, are tied together to a positive voltage supply. The gates of M3 and M5 are tied together, and to the drain of transistor M1. The gates of transistors M4 and M6 are tied together, and to the drain of transistor M2. The sources of M3, M4, M5, and M6 are grounded. The drains of M6 and M6, respectively, are coupled to the drains of M7 and M8 whose gates are tied together. While the specific preferred embodiment of the OTA stage 12 is shown in FIG. 8, it is to be understood that other amplifier arrangements may provide the same drive characteristics required by the remainder of the protection circuit.

With continuing reference to FIG. 8, transistor M10 can be seen to be an output device. A variety of current mirror means for modifying the gain can be employed. The type shown in the preferred embodiment is through transistor M12. The current of transistor M10 is fractionally mirrored back to the drains of M6 and M8 by transistor M12. In the absence of transistor M12, the gain at the gate of transistor M10 would be determined by the net output impedance of transistors M6 and M8. The inclusion of transistor M12 reduces the gain by adding a lower impedance path in parallel with the drains of transistors M6 and M8. Alternatively, one or more bipolar transistors (not shown) may be used in place of transistors M10 and M12. However, the ratio of current returned to the drains of transistors M6 and M8 would be dependent on the β of the bipolar transistor(s). Such β would vary significantly with bipolar transistor design, processing, and operating temperature, while using the MOSFET mirror in transistor M12 allows this mirror fraction to be determined essentially by device geometries.

FIG. 8 is also seen to include transistors M9 and M11. These transistors provide a first-order correction for an input offset error due to the current from transistor M12. Transistors M9 and M11 accomplish this by injecting a matching current into the mirror side of the OTA 12 that includes M12. This injected current is designed to match the current from transistor M12 if the current in transistor M10 is exactly $I_B$. When the current in transistor M10 varies from $I_B$, such variation will be reflected at the input of the OTA 12. In this way, the present invention provides a circuit with finite gain that is established by transistors M1 through M12 geometry alone.

Figure 9:
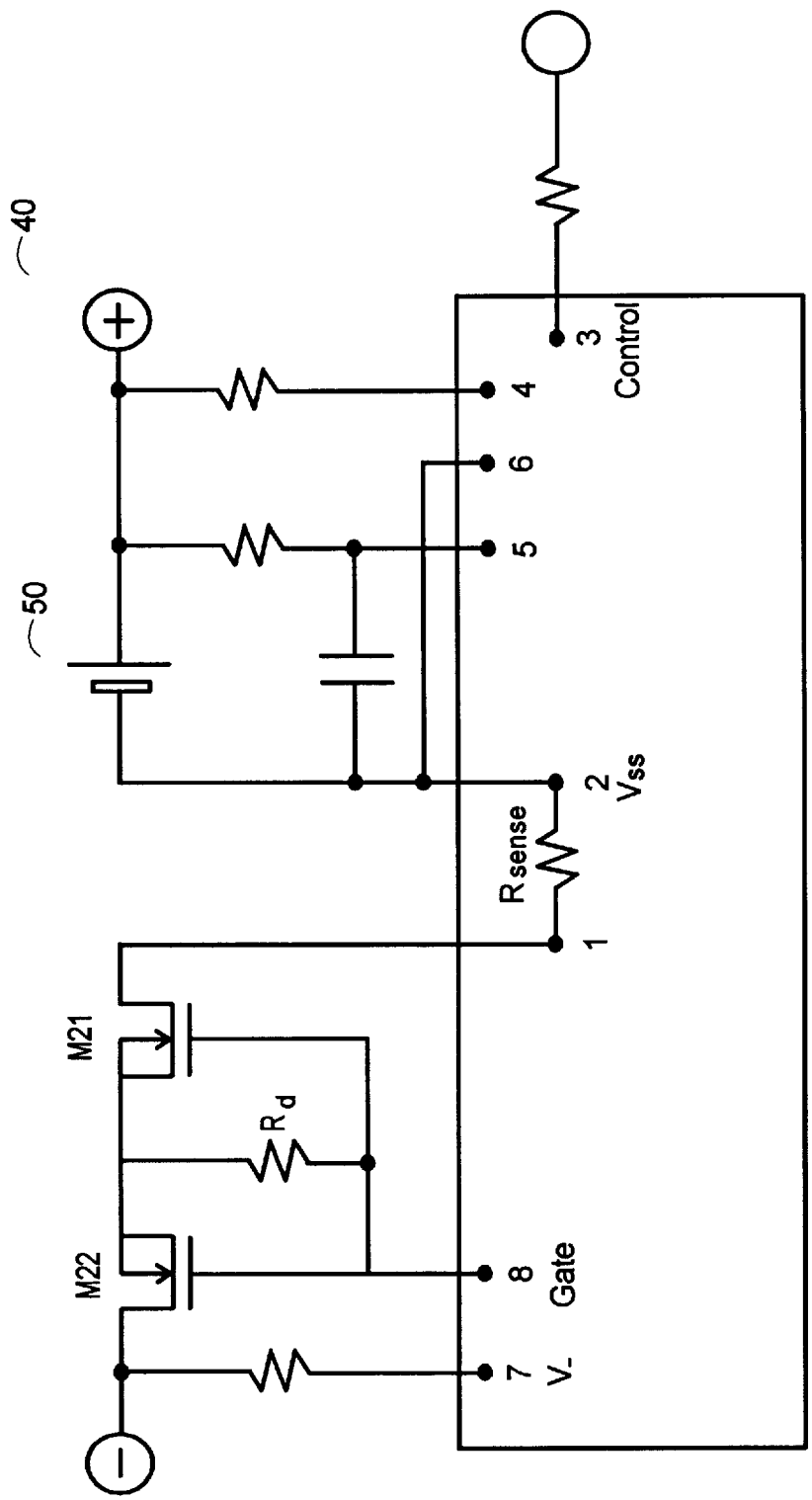
FIG. 9 is a diagram of an integrated embodiment of the protection circuit in accordance with the present invention.

FIG. 9 shows a diagram of a battery pack 40 incorporating the present invention in an eight-pin integrated circuit (IC) package designed to protect a battery cell 50. The device presented in FIG. 9 differs from the circuit of FIG. 6 only in that FIG. 9 provides a broad view of the components necessary to control the rectification circuit in the context of the battery pack 40. It is to be noted that, in the OFF state, the OTA 12 would not drive the gates of the external MOSFETs. With further reference to this figure, the first pin 1 is a terminal of an optional internal current-sensing resistor $R_{SENSE}$. The second pin 2 is a negative IC supply and sense pin for the battery cell's negative terminal. The third pin 3 CONTROL, is used for enabling and disabling MOSFET drive and power-down modes. The fourth pin 4 is a sense pin for the cell's positive terminal. The fifth pin 5 is for coupling to a positive IC supply. The sixth pin 6 is a connection to pin 5 and is used for testing. The seventh pin 7 is used to monitor the negative potential of the pack. The eighth pin 8 GATE, is the gate drive for the external MOSFETs M21 and M22. The GATE pin is switched to positive supply pin 5 in the ON condition and is a high impedance during the OFF condition, and driven by the OTA 12 for active rectification.

Although the present invention has been described with specific reference to particular arrangements and components, it is to be understood that the invention is not limited in that regard. The present invention includes those equivalents within the scope of knowledge of those skilled in the art.

We claim:

1. An active rectification circuit couplable to a reversible current source, said circuit comprising:

a) a difference amplifier coupled to a biasing reference voltage said amplifier having an input and an output, wherein said difference amplifier is coupled to a current mirror designed to modify the gain of said difference amplifier; and b) a body-diode-free transistor element, said transistor element including a first MOSFET and a second MOSFET, said first MOSFET and second MOSFET being N-channel transistors coupled together source to source and having a common control node coupled to said output of said amplifier, wherein said transistor element is coupled to said input of said amplifier and wherein said biasing reference voltage controls the activation of said transistor element.

2. The rectification circuit as claimed in claim 1 wherein said biasing reference voltage is produced by coupling a first bipolar transistor to a noninverting terminal of said difference amplifier and a second bipolar transistor to an inverting terminal of said difference amplifier, wherein a current density of said bipolar transistor is greater than a current density of said second bipolar transistor.

3. The rectification circuit as claimed in claim 2 wherein said first bipolar transistor has a first active area and said second bipolar transistor has a second active area, said first active area being about four times greater than said second active area.

4. An active rectification circuit comprising:

a) an amplifier element coupled to a voltage source; and a body-diode-free transistor element, said transistor element being a MOSFET and having a gate terminal coupled to an output of said amplifier element, wherein said MOSFET is coupled to an input of said amplifier, said output is couplable to a reversible current source, and said amplifier is designed to switch said MOSFET on or off as a function of a current from said current source.

wherein said MOSFET acts as a rectifier to rectify an input signal, said amplifier element automatically controls said MOSFET in response to a predetermined condition of said signal, and wherein said MOSFET has four terminals including a source terminal, a bulk terminal, a drain terminal, and said gate terminal, wherein said source terminal and said body terminal serve as an anode of said rectifier, and wherein said drain terminal serves as a cathode of said rectifier.

5. The active rectification circuit of claim 4, except where said transistor element is a pair of MOSFET transistors.

6. The active rectification circuit of claim 5 wherein said MOSFET transistors are N-channel transistors.

7. The active rectification circuit of claim 5 wherein said MOSFET transistors are P-channel transistors.

8. The active rectification circuit claimed in claim 4 wherein said amplifier element is an operational transconductance amplifier having a positive input terminal coupled to said anode, a negative input terminal coupled to said cathode, and an output terminal coupled to said gate terminal of said transistor element.

9. The active rectification circuit claimed in claim 8 wherein said protection circuit includes a bias voltage element for activating said rectifier.

10. The active rectification circuit as claimed in claim 9 wherein said bias voltage element is connected between said negative input terminal of said amplifier and said rectifier cathode.

11. The active rectification circuit as claimed in claim 10 wherein said bias voltage element is connected between a negative input terminal of said amplifier and a cathode of said rectifier.

12. An active rectification circuit, said circuit comprising:
   a) a difference amplifier, said difference amplifier being coupled to a current mirror designed to modify the gain of said difference amplifier; and
   b) a body-diode-free transistor element, said transistor element being a MOSFET pair,
wherein said difference amplifier automatically controls said transistor element in response to a predetermined condition of a signal.

13. The active rectification circuit as claimed in claim 12 wherein said difference amplifier includes a plurality of MOSFET transistors.

14. A method of rectifying a reversible current comprising the steps of:
   a) coupling a pair of MOSFETs to said reversible current;
   b) coupling a difference amplifier to a control node of said pair of MOSFETs;
   c) supplying a biasing reference voltage to a difference amplifier by coupling a first bipolar transistor to a noninverting terminal of said difference amplifier, and coupling a second bipolar transistor to an inverting terminal of said difference amplifier, so as to define a threshold potential for operation of said pair of MOSFETs,
wherein a current density of said first bipolar transistor is greater than a current density of said second bipolar transistor.

15. The method as claimed in claim 14 wherein the step of supplying said biasing reference voltage to said difference amplifier includes the step of:
   a) coupling said first bipolar transistor to said inverting terminal of said difference amplifier; and
   b) coupling said second bipolar transistor to said noninverting terminal of said difference amplifier,
wherein said current density of said first bipolar transistor is greater than said current density of said second bipolar transistor.

16. The method as claimed in claim 14 wherein said current density of said first bipolar transistor is about four times greater than said current density of said second bipolar transistor.

17. The method as claimed in claim 16 further comprising the step of coupling a digital switch to said first bipolar transistor and to said second bipolar transistor.

18. The method as claimed in claim 17 further comprising the step of coupling a digital switch between said difference amplifier and a common gate of said pair of MOSFETs.

\* \* \* \* \*

UNITED STATES PATENT AND TRADEMARK OFFICE
CERTIFICATE OF CORRECTION

PATENT NO. : 5,847,912
DATED : December 8, 1998
INVENTOR(S) : Gregory J. Smith, et al.

It is certified that error appears in the above-indentified patent and that said Letters Patent is hereby corrected as shown below:

On the title page item [73], should be inserted as follows:

-- National Semiconductor Corporation, Santa Clara, Calif. --

Signed and Sealed this

Twenty-sixth Day of October, 1999

Attest:

Q. TODD DICKINSON

Attesting Officer

Acting Commissioner of Patents and Trademarks